United States Patent [19]

Yoo

[11] Patent Number: 5,895,336

[45] Date of Patent: Apr. 20, 1999

[54] FORWARD-DRIVE APPARATUS FOR A BICYCLE

[76] Inventor: Mun-Su Yoo, 203-405, Samic Apt. Gaeshin-dong, Cheongju-si, Chung Cheong Buk-do, Rep. of Korea

[21] Appl. No.: 08/837,979

[22] Filed: Apr. 14, 1997

Related U.S. Application Data

[63] Continuation-in-part of application No. 08/490,388, Jun. 14, 1995, abandoned.

[30] Foreign Application Priority Data

Jun. 14, 1994 [KR] Rep. of Korea ............... 94-13391

[51] Int. Cl.$^6$ ........................................... F16H 3/44
[52] U.S. Cl. ........................... 475/318; 475/320; 280/238
[58] Field of Search ............................. 475/318, 320; 280/238

[56] References Cited

U.S. PATENT DOCUMENTS

| 504,168 | 8/1893 | Marris ................... 280/237 |
| 587,787 | 8/1897 | Buckler .................. 280/238 |
| 5,435,583 | 7/1995 | Foster, Jr. ............... 280/237 |

FOREIGN PATENT DOCUMENTS

| 745409 | 5/1933 | France ................... 280/237 |
| 91-3286 | 6/1991 | Rep. of Korea . |
| 92-1405 | 2/1992 | Rep. of Korea . |

*Primary Examiner*—Dirk Wright
*Attorney, Agent, or Firm*—Lowe Hauptman Gopstein Gilman & Berner

[57] ABSTRACT

An apparatus for changing power direction for a bicycle is provided. The apparatus for changing power direction roughly including a shaft housing, a change ring, a carrier, a sun gear and a sprocket cap is located between a pedal shaft and a driving sprocket. The shaft housing supports the rotating pedal shaft and controls the carrier by using a plurality of pawls to be released from and inserted into a plurality of openings formed at the inside of a rim of a right cap of the shaft housing when pedaling rearward. The change ring releases and inserts the pawls from and into the shaft housing when pedaling rearward, and the carrier having a first ratchet and a second ratchet at the outside and inside of a left portion thereof, respectively, and a plurality of planetary gears to be rotatably set at a right portion maintains or changes the direction of power from the pedal shaft, thereby transmitting the power to a driving sprocket. The sun gear transmits the driving force of the pedal shaft to the carrier while being coupled with the pedal shaft. Also, the sprocket cap having a gear at the right of the inside of the rim thereof receives the power from the carrier to travel the bicycle forward at all times regardless of forward and backward pedaling directions. Therefore, the bicycle travels forward when pedaling forward and rearward in the state where the apparatus for changing power direction is installed to the bicycle. Also, an idling may occur if required when pedaling rearward in the state where the apparatus for changing power direction is installed to the bicycle.

16 Claims, 9 Drawing Sheets

1

FORWARD-DRIVE APPARATUS FOR A BICYCLE

This application is a continuation-in-part of application Ser. No. 08/490,388, filed June 14, 1995 now abandoned.

TECHNICAL FIELD

The present invention relates to an apparatus for changing power direction for a bicycle, and more particularly, to an apparatus for changing power direction attached to a pedal shaft hub for a bicycle in which the bicycle can travel forward at all times by controlling a changing lever when pedaling the bicycle forward or rearward, and an idling is also allowed if required when pedalina the bicycle rearward, like when pedaling a conventional bicycle rearward.

BACKGROUND ART

Generally, a bicycle includes front and rear wheels before and after a bicycle frame, and a pair of pedals as a power supply source between two wheels. The driving force for bicycle is obtained through pedaling and then the force is transmitted to the rear wheel via a driving sprocket, a chain and a driven sprocket. This general bicycle travels forward when pedaling forward by a rider and the rear wheel of the bicycle rotates without load by an one-directional ratchet of a hub of the rear wheel when pedaling rearward, wherein the rotation of the rear wheel without load is called "idling".

Also, inventions for new parts of bicycle which can allow of bi-directional pedaling to the general bicycle to which only one-directional pedaling is allowed have been disclosed. Particularly, those of Mantzoursos et al. and Foster et al. will be introduced as follows.

According to the invention of Mantzoutsos et al. (EPO Publication No. 0,369,925), two gears are installed on a pedal shaft and an auxiliary gear is installed between two gears to be detachable. Here, the bicycle of this invention can travel like a general bicycle when pedaling in the state where the auxiliary gear is detached. However, the bicycle can travel forward through the change of rotation direction of the pedal shaft by the auxiliary gear when pedaling rearward while the auxiliary gear is attached.

On the other hand, according to the invention of Forster et al. (U.S. Pat. No. 5,435,583), a gear box is installed on a pedal shaft, including two gears, two clutches therebetween and a bevel gear between two gears' teeth. Here, the bicycle of this invention can travel like a general bicycle when pedaling while the clutch is coupled with the right gear. However, the bicycle can travel forward through the change of the rotation direction of the pedal shaft by the bevel gear when pedaling rearward while the clutch is coupled with the left gear.

The above two inventions are meaningful in the aspect of the bi-directional pedaling apparatus which can drive the bicycle forward by adopting a mid gear when pedaling rearward. However, life span of the bi-directional pedaling apparatus is shortened due to abrasion of a specific portion to which a force required for changing the power direction is applied and there is inconvenience in the operation of the apparatus for changing power direction.

A bi-directional pedaling apparatus obtained by solving the above defects is disclosed in Korean Patent Application No. 94-13391. According to this application, a predetermined closed space is formed between one end of a pedal shaft and a driving sprocket, and two one-directional ratchets are installed at the outer and inner portions of the space.

Also, a ratchet wheel to which a plurality planetary gears are rotatably set, and a changing lever for controlling the locking and unlocking of the outer one-directional ratchet are provided in the closed space. The bi-directional pedaling mechanism of the bicycle in the bi-diredtional pedaling apparatus is as follows.

When pedaling forward, the pedal, the ratchet wheel and the driving sprocket integrally rotate to travel the bicycle forward. Meanwhile, the outer one-directional ratchet instead of the inner one-directional ratchet functions by the changing lever when pedaling rearward. Here, there are two cases where the outer ratchet is locked and unlocked. First, when pedaling rearward while the outer ratchet is locked, the plurality of planetary gears rotate around own shafts thereof, so that the rotation direction of the pedal shaft is changed and then power from the pedal shaft is transmitted to the driving sprocket, thereby driving the bicycle forward. Second, when pedaling rearward while the outer ratchet is unlocked, the planetary gears rotate and simultaneously revolve around the pedal shaft in cooperation with the ratchet wheel. As a result, power from the pedal shaft cannot be transmitted to the driving sprocket, resulting in the idling of the pedal.

According to the above-described Korean Patent Application No. 94-13391, the concentration of force on a specific portion by the changing of power direction is prevented by dispersing the force using the plurality of planetary gears. Thus, life span of the bi-directional pedaling apparatus is prolonged and the rotation direction of the pedal shaft can be simply changed by using the changing lever. Also, the bi-directional pedaling apparatus can operate actively by adopting small and precise parts.

However, in the above-described Korean Patent Application No. 94-13391, mass production of the parts and assembling of each part are difficult and the bi-directional pedaling apparatus cannot be attached directly to a conventional bicycle, so that the parts thereof should be improved partially. Also, each constituent part may be broken by a reverse-load caused when pulling back the bicycle.

DISCLOSURE OF THE INVENTION

As an improved invention from the Korean Patent Application No. 94-13391, it is an object of the present invention to provide an apparatus for changing power direction for a bicycle which can be produced on a large scale by improving the shape of each constituent part to be suitable for the simple manufacture and assembling of the parts, which can be directly attached to a conventional bicycle by improving parts and adopting an auxiliary means, and simultaneously which can prevent the damage of parts caused by a reverse-load.

The apparatus for changing power direction of the present invention includes basic constituent elements for the bicycle, such as a pedal shaft, a rear wheel, a driving sprocket rotating with being formed on the pedal shaft, a driven sprocket for transmitting the driving force of the driving sprocket to the rear wheel, and a chain connecting the driving sprocket and the driven sprocket. The basic characteristic of the present invention is the "apparatus for changing power direction" formed in a closed space between the pedal shaft and the driving sprocket. Here, the shape of parts used for constituting the apparatus for changing power direction is a hollow cylindrical, ring -or gear-type.

The apparatus for changing power direction of the present invention, located between the pedal shaft and the driving sprocket, roughly includes a shaft housing, a change ring, a carrier, a sun gear and a sprocket cap. The functions of each constituents are as follows.

The shaft housing receiving the change ring, the carrier and the sun gear supports the rotating pedal shaft and simultaneously controls the carrier by using a plurality of pawls to be released from and inserted into a plurality of openings formed at the inside of a rim of a right cap of the shaft housing when pedaling rearward. The change ring releases and inserts the pawls from and into the shaft housing when pedaling rearward, and the carrier having ratchets at the outside and inside of a left portion thereof, respectively, and a plurality of planetary gears to be rotatably set at a right portion maintains or changes the direction of power from the pedal shaft, thereby transmitting the power to a driving sprocket. The sun gear transmits the driving force of the pedal shaft to the carrier while being coupled with the pedal shaft. Also, the sprocket cap having a gear at the right of the inside of the rim thereof receives the power from the carrier to travel the bicycle forward at all times regardless of forward and backward pedaling directions.

Therefore, the bicycle travels forward when pedaling forward and rearward in the state where the apparatus for changing power direction is installed to the bicycle. The apparatus for changing power direction of the present invention as one of "bi-directional pedaling apparatus" is different from the conventional bi-directional pedaling apparatus in the constituent parts and operating mechanism. In addition, according to the apparatus for changing power direction of the present invention, the shapes of each constituent elements are optimized, thereby preventing the concentration of load on a specific portion. Also, all constituent parts are integrally formed, thereby simplifying the assembling process thereof. The apparatus for changing power direction adopts a changing lever so as to easily operate the same, and an auxiliary ring which is for installing the apparatus for changing power direction to the conventional bicycle without the modification of the conventional bicycle.

BEST MODE FOR CARRYING OUT THE INVENTION

The present invention will be described in detail with reference to FIGS. 1 to 5.

Figure 1:
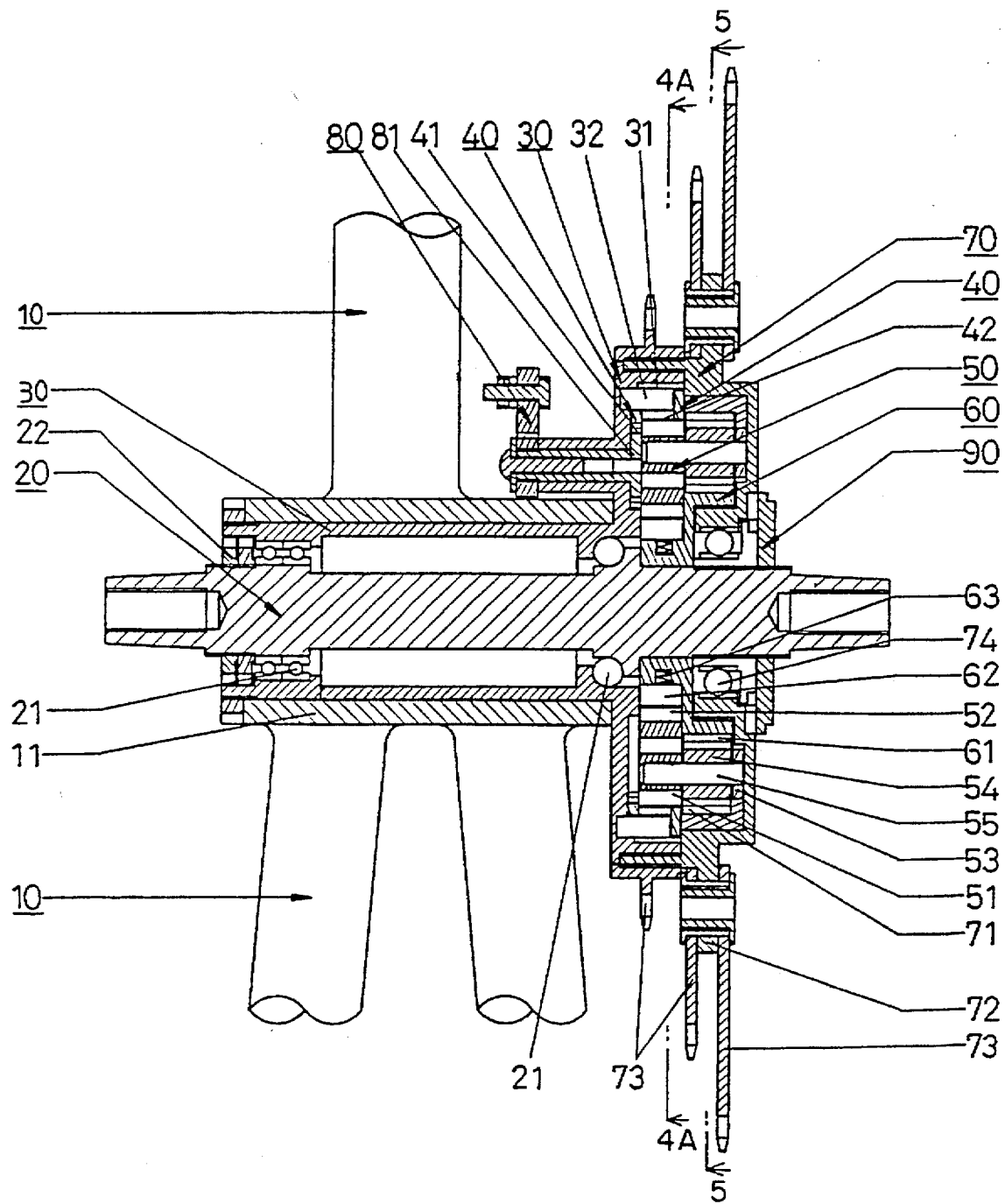
FIG. 1 is a cross-sectional view of an apparatus for changing power direction for a bicycle according to the present invention.
Figure 2:
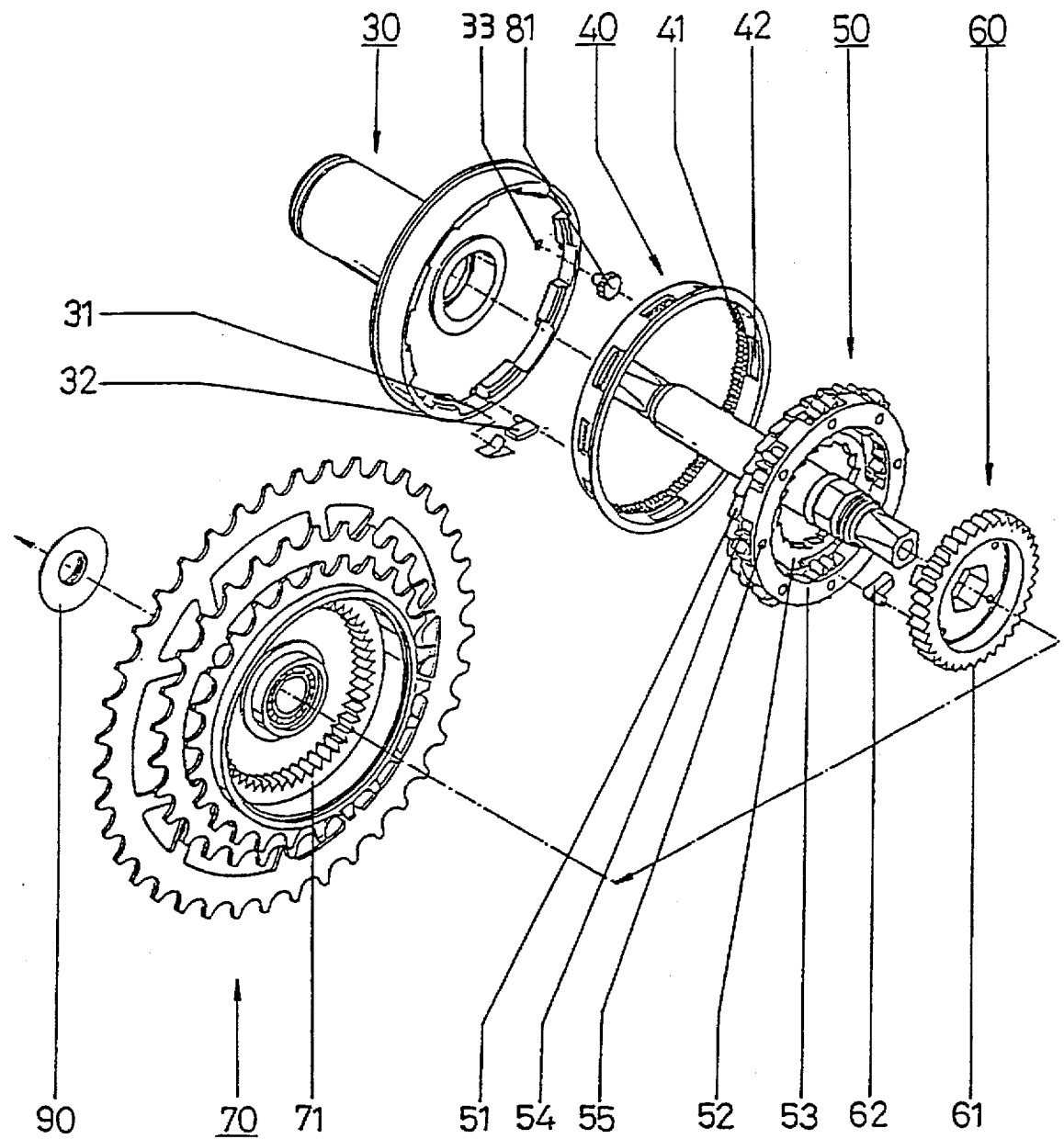
FIG. 2 is an exploded perspective view of the apparatus for changing power direction according to the present invention.

As shown in FIGS. 1 and 2, a shaft housing 30, a change ring 40, a carrier 50 and a sun gear 60 and a sprocket cap 70 are coupled in sequence on a pedal shaft 20 of a bicycle to form an integrated apparatus for changing power direction by attaching a fixing nut 90 to the outside of the sprocket cap 70. The structures of each part and functions thereof will be described in sequence.

The shaft housing 30 supports the rotating pedal shaft 20, and has a plurality of openings 31 at the inside of a rim of a right cap of the shaft housing 30, into which a plurality of first pawls 32 are inserted. Also, a hole 33 to which a first gear 81 for controlling the change ring 40 is fitted is formed at the sidewall of the right cap. The shaft housing 30 having the above structure holds the change ring 40, the carrier 50 and the sun gear 60 in sequence and simultaneously has a function of rotating the carrier 50 or preventing the rotation of the carrier 50 by using the first pawls 32 placed at the rim of the shaft housing 30 when pedaling backward. Here, a spring is inserted between the shaft housing and the first pawls 32 to elastically holding the first pawls 32 in the openings 31.

The change ring 40 has a second gear 41 at one side thereof toward the pedal shaft and a plurality of holes 42 at the surface portion thereof. The second gear 41 is in mesh with the first gear 81 to rotate the change ring 40 and the holes 42 is for permitting projection or shrink of the first pawls 32. The carrier 50 cannot rotate when the first pawls 32 are slid into the holes 42, and the carrier 50 can rotate when the change ring 40 blocks the first pawls 32 within the openings 31 of the shaft housing 30.

The carrier 50, having a hollow cylindrical shape, has a first ratchet 51 and a second ratchet 52 at the outside and inside of a left portion, respectively, and a ring 53 having a plurality of holes at a right portion of the carrier 50, wherein the right portion is integrally coupled with the left portion such that a plurality of planetary gears 54 are rotatably set by a planetary gear shaft 55 in the ring 53. The first ratchet 51 of the carrier 50 having the above structure is engaged with the first pawls 32 of the shaft housing 30 and the second ratchet 52 is engaged with second pawls 62 of a third gear 61 which will be explained later. On the other hand, an inner portion of the planetary gears 54 of the carrier 50 is engaged with a third gear 61 of the sun gear 60 and an outer portion thereof is engaged with a fourth gear 71 formed at the inside of the sprocket cap 70 which will be explained later.

The carrier 50 has a function of transmitting the power from the pedal shaft 20 to the sprocket cap 70 by maintaining or changing the direction of power from the pedal shaft 20, which is the most important in the present invention. The planetary gears 54 of the carrier 50 disperses the force concentrated on a specific portion by the change of the power direction and preferably, the number of planetary gears is eight.

The sun gear 60, having a hollow cylindrical shape with steps, a left portion with smaller diameter of the sun gear 60 has a plurality of openings 63 at the outside thereof, to which the second pawls 62 are set, and the inside of the left portion has a central opening having a hexagonal and spline-like shape such that the left portion is integrally fixed to the pedal shaft 20. Also, a right portion with larger diameter of the sun gear 60 has the third gear 61 at the outside thereof. In the sun gear 60 having the above structure, the second pawls 62 are engaged with the second ratchet 52 of the carrier 50 and the third gear 61 is engaged with the planetary gears 54 of the carrier 50. Here, the number of the second pawls is preferably four.

Figure 3:
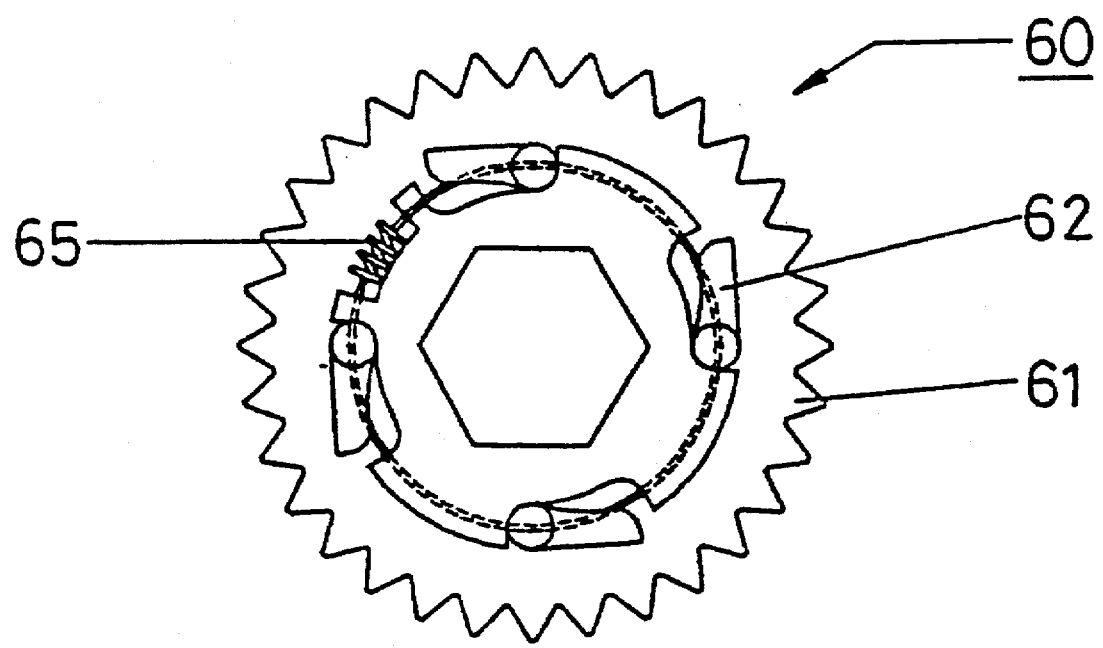
FIG. 3 is a right side view showing an example of a sun gear adopted in the apparatus for changing power direction according to the present invention.

Here, elasticity can be provided to the first and second pawls 32 and 62 by the following methods. First, a coil or leaf spring is inserted beneath the pawls Second, a flute is formed at each pawl with a predetermined angle as shown in FIG. 3 and then each pawl is connected by an annular spring 65 to provide a linear tension.

Also, according to the present invention, the first pawls 32 and the change ring 40 locate at the outside of the carrier 50 to control the carrier 50 only when the pedal shaft 20 rotates reversely. Also, the second pawls 62 locate at the outside of the sun gear 60 to allow one-directional rotation to the carrier 50 in the forward rotation.

Since the sun gear 60 is integrally coupled with the pedal shaft 20, the sun gear 60 transmits the power from the pedal shaft 20 to the carrier 50 while rotating in the same direction as the rotation direction of the pedal shaft 20.

The sprocket cap 70 has the fourth gear 71 at the right of FIG. 1 of the inside of the rim thereof, and a plurality of screws or brackets 72 at the outside of the rim, such that driving sprockets 73 having multiples steps is coupled thereto. Also, a bearing 74 is fixed at the center of the sprocket cap 70, so that the sprocket cap 70 can freely rotate independent on the pedal shaft 20. The fourth gear 71 of the sprocket cap 70 having the above structure is engaged with the planetary gears 54, thereby receiving power from the pedal shaft 20 via the carrier 50.

The sprocket cap 70 rotates forward at all times regardless of the rotation direction of the pedal shaft 20.

Also, reference numerals 10, 11, 21 and 22 in FIG. 1 which are not explained above represent a bicycle frame, a pedal shaft hub, a shaft bearing and a washer, respectively.

When coupling the shaft housing 30 with the sprocket cap 70 on the pedal shaft 20 of the bicycle, a closed space is formed therebetween, and the change ring 40, the carrier 50 and the sun gear 60 are assembled being engaged each other in the space and a fixing nut 90 is fixed to the outside of the sprocket cap 70, thereby forming an integrated apparatus for changing power direction.

The integrated power changing apparatus is assembled by the following sequence. First, the pedal shaft 20 is rotatably set in the shaft housing 30, and then the change ring 40, the carrier 50, the sun gear 60 and the sprocket cap 70 are assembled in sequence centering the pedal shaft 20 within the shaft housing 30. Then, the fixing nut 90 is fixed to the outside of the sprocket cap 70, thereby resulting in an integrated apparatus for changing power direction.

Also, a changing lever 80 for controlling the change ring 40 is set at the sidewall of the shaft housing 30 and connected to the first gear 81. Thus, the changing lever 80 moves the change ring 40 using the motion of the first gear 81.

The operation and effect of the apparatus for changing power direction according to the present invention having the above structure will be described below.

For convenience' sake in description, the operation of the present invention will be described by classifying the operational method into "forward traveling by forward pedaling", "forward traveling by rearward pedaling", and "idling by rearward pedaling".

Figure 4A:
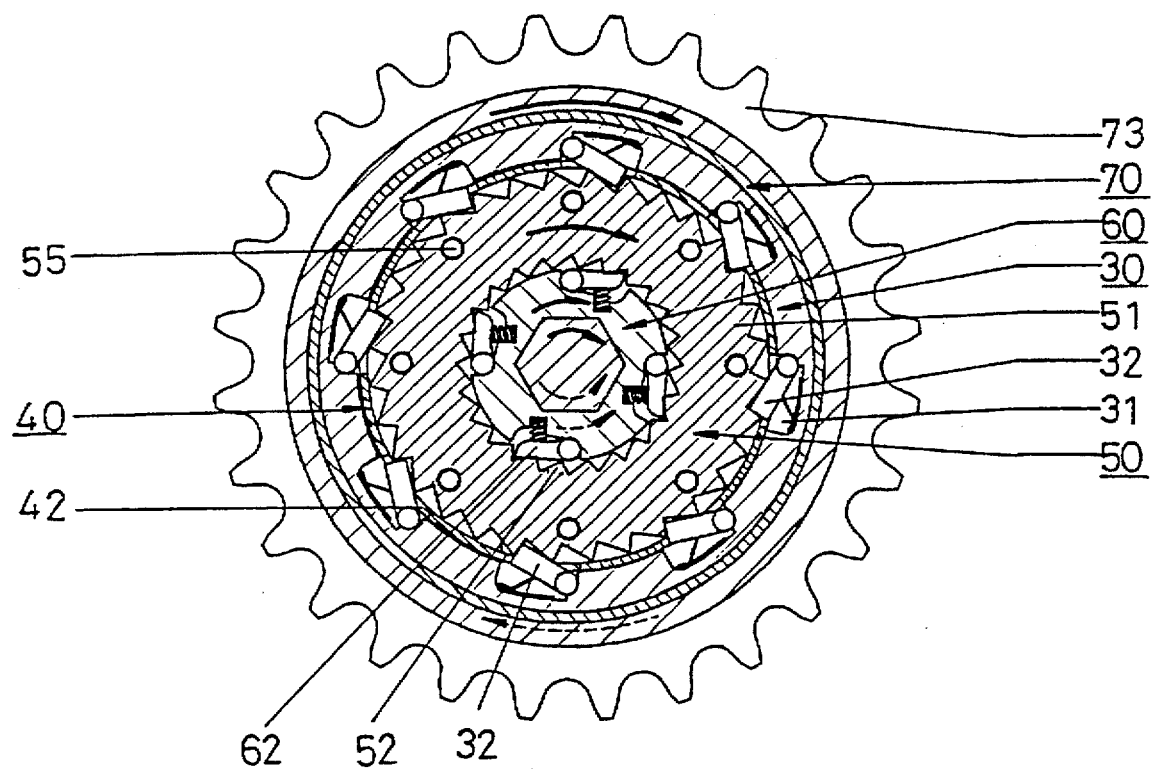
FIG. 4A is an operational diagram of the apparatus for changing power direction, cut along line 4A—4A of FIG. 1, when a change ring allows the release of the first pawls— from the openings of the shaft housing.
Figure 4B:
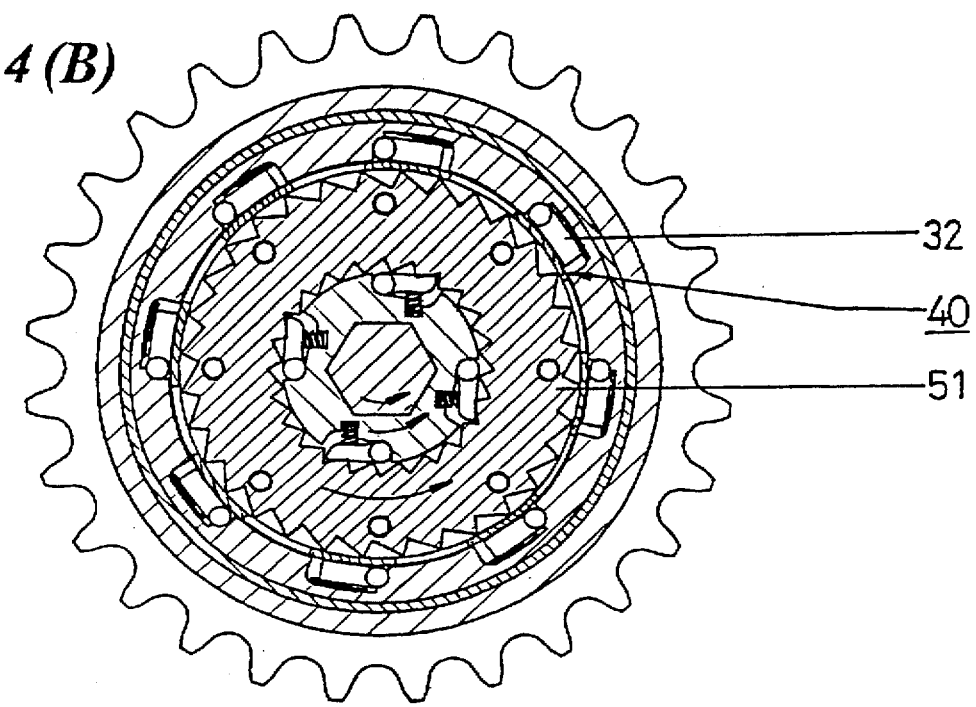
FIG. 4B is an operational diagram of the apparatus for changing power direction, cut along line 4A—4A of FIG. 1, when the change ring blocks the release of the first pawls from the openings of the shaft housing.
Figure 5:
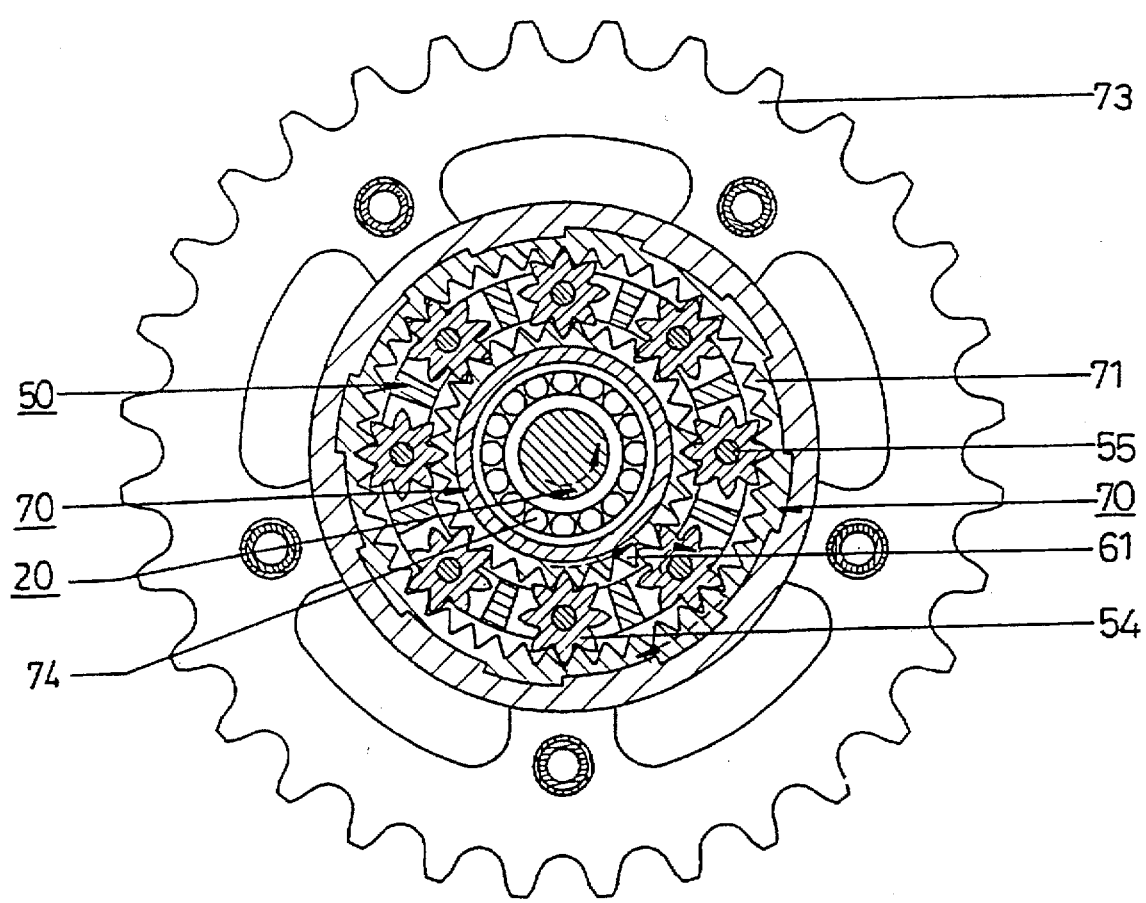
FIG. 5 is a cross-sectional view of the apparatus for changing power direction, cut along line 5—5 of FIG. 1.

First, "forward traveling by forward pedaling" means that the bicycle travels forward when driving pedal shaft 20 clockwise (this direction is referred based on the case where the bicycle is viewed from the right with respect to the traveling direction of the bicycle, which is also applied to the following description) as shown in FIGS. 4 and 5. Here, the power from the pedal shaft 20 is transmitted as follows.

When driving the pedal shaft 20 clockwise, the sun gear 60 rotates clockwise in cooperation with the pedal shaft 20. Here, since the second pawls 62 are engaged with the second latch 52, the carrier 50 rotates in the same direction as the pedal shaft 20. Accordingly, the planetary gears 54 do not rotate for themselves while the fourth gear 71 of the sprocket cap 70 which are engaged with the planetary gears 54 rotates clockwise. Thus, the pedal shaft 20 and the sprocket cap 70 rotate in the same direction each other, thereby traveling the bicycle forward.

Second, "forward traveling by rearward pedaling" means that the bicycle travels forward when driving pedal shaft 20 counterclockwise. Here, the power from the pedal shaft 20 is transmitted as follows. For this operation, the first pawls 32 and the first ratchet 51 should be engaged each other by controlling the change ring 40 as shown in FIG. 4A.

When driving the pedal shaft 20 counterclockwise, the sun gear 60 rotates counterclockwise in cooperation with the pedal shaft 20. Here, since the second pawls 62 is slid over the second latch 52, it is impossible to transmit power to the carrier 50. Meanwhile, as shown in FIG. 5, the third gear 61 of the sun gear 60 transmits power to the planetary gears 54 which are engaged with the sun gear 60, thereby rotating the planetary gears 54 clockwise. Here, the rotation of the planetary gears 54 provides a force for rotating the carrier 50 which is integrally coupled with the planetary gears 54. However, the carrier 50 cannot rotate counterclockwise since the first pawls 32 are engaged with the first ratchet 51 of the carrier 50 as shown in FIG. 4A. Thus, the sprocket cap 70 engaged with the planetary gears 54 rotates clockwise while only the planetary gears 54 rotate as shown in FIG. 5. By this operation, direction of the driving force applied to the pedal shaft 20 in the counterclockwise is changed via the apparatus for changing power direction of the present invention, thereby rotating the sprocket cap 70 clockwise.

Third, "idling by rearward pedaling" means that the bicycle cannot travel since the power is not transmitted to the sprocket cap 70 while only idling occurs when driving pedal shaft 20 counterclockwise. Here, the power from the pedal shaft 20 is transmitted as follows. For this operation, the first pawls 32 of the shaft housing 30 and the first ratchet 51 of the carrier 50 should not be engaged each other by controlling the change ring 40 as shown in FIG. 4B.

Here, the power transmit process for the above operation is the same as those of "forward traveling by rearward pedaling" to the step where counterclockwise force is applied to the carrier 50 by the planetary gears 54, except that the carrier 50 itself revolves around the pedal shaft 20 counterclockwise while the planetary gears 54 rotate since the first pawls 32 are not engaged with the first ratchet 51. Thus, power from the pedal shaft 20 is transmitted only to the carrier 50, not to the sprocket cap 70, so that the bicycle cannot travel.

The idling by rearward pedaling in the general bicycle is different from the "idling by rearward pedaling" byte apparatus for changing power direction of the present invention in the following aspects. That is, in the idling by rearward pedaling in the general bicycle, the driving sprocket and the chain reversely rotate in cooperation with the pedal shaft. However, the driving sprocket and the chain do not rotate in the present invention.

As described above, the apparatus of the present invention as one of "bi-directional forward traveling apparatus" transmits power in the different manner from the conventional apparatus by adopting new parts. Also, since the shape of each constituent part is optimized, concentration of load on a specific portion is prevented. Also, each part is integrated, so that the assembling can be performed simply. In addition, a lever is attached to simplify the operation of the apparatus and the structure of the shaft housing is modified to be directly attachable to the conventional bicycle, which will be explained in the following embodiments of the present invention.

Hereinafter, the first, second and third embodiments of the present invention will be described based on the above present invention. In the first embodiment, the locations of an one-directional ratchet used for the forward rotation and a ratchet for controlling the reverse rotation are shifted each other. In the second embodiment, the changing lever is replaced by a wire. Also, in the third embodiment, the shape of the shaft housing is modified such that the apparatus for changing power direction can be attached directly without modification of the conventional bicycle.

EMBODIMENT 1

Referring to FIGS. 6 to 9, a basic characteristic of this embodiment is to change the locations of an one-directional ratchet used for the forward rotation and a ratchet for controlling the reverse rotation. That is, the location of the ratchet used for the forward rotation is shifted from the inside of the carrier to the outside thereof while the location of the ratchet used for controlling the reverse rotation is shifted vice versa.

For shifting the locations of the above two ratchets, each constituent part is manufactured with different shape from the above-described present invention. However, the number of parts are the same as the above present invention and the operation thereof is similar to the above present invention. The shape of the modified parts will be described as follows.

Figure 6:
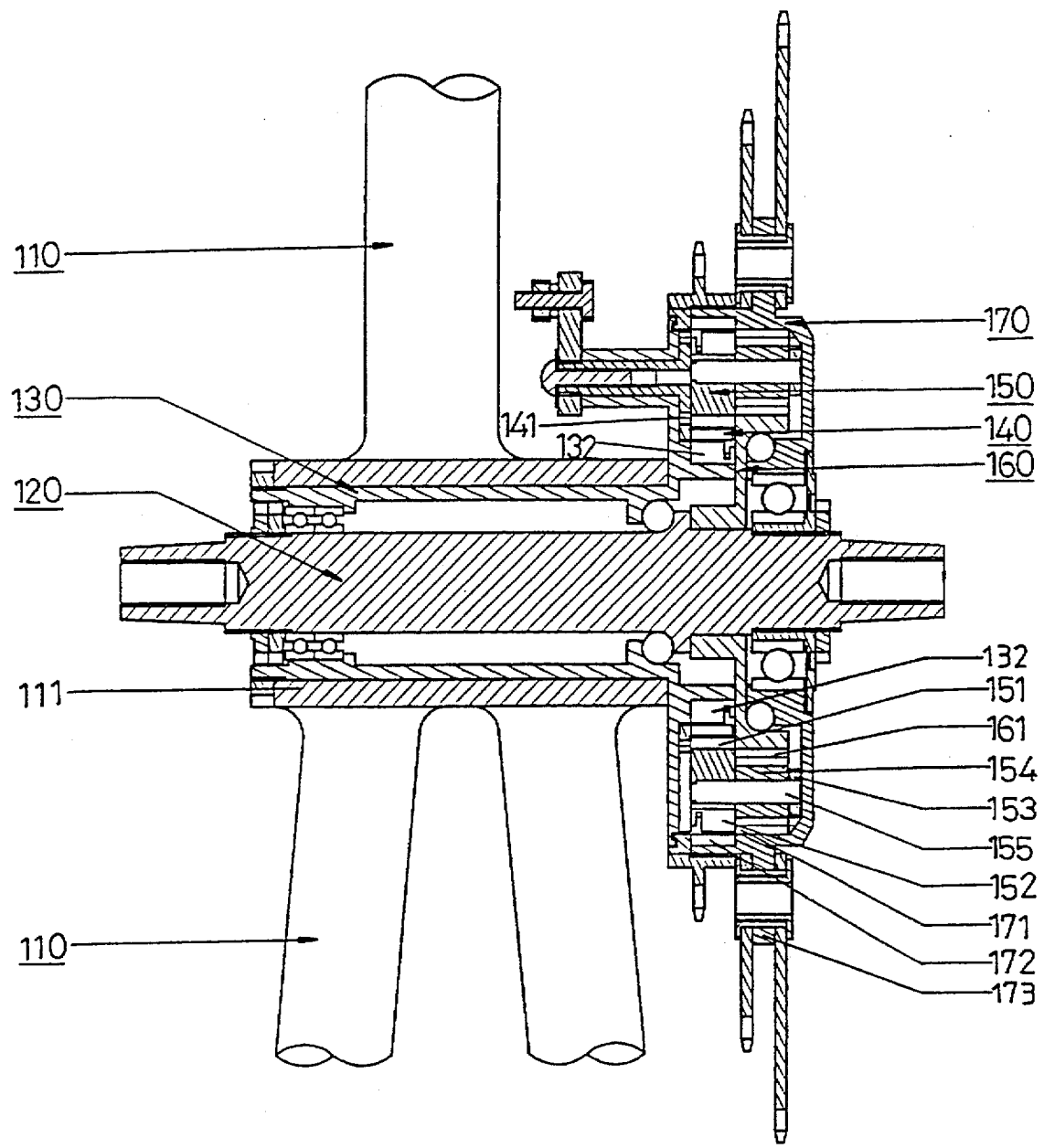
FIG. 6 is a cross-sectional view of the apparatus for changing power direction according to a preferred embodiment of the present invention.
Figure 7:
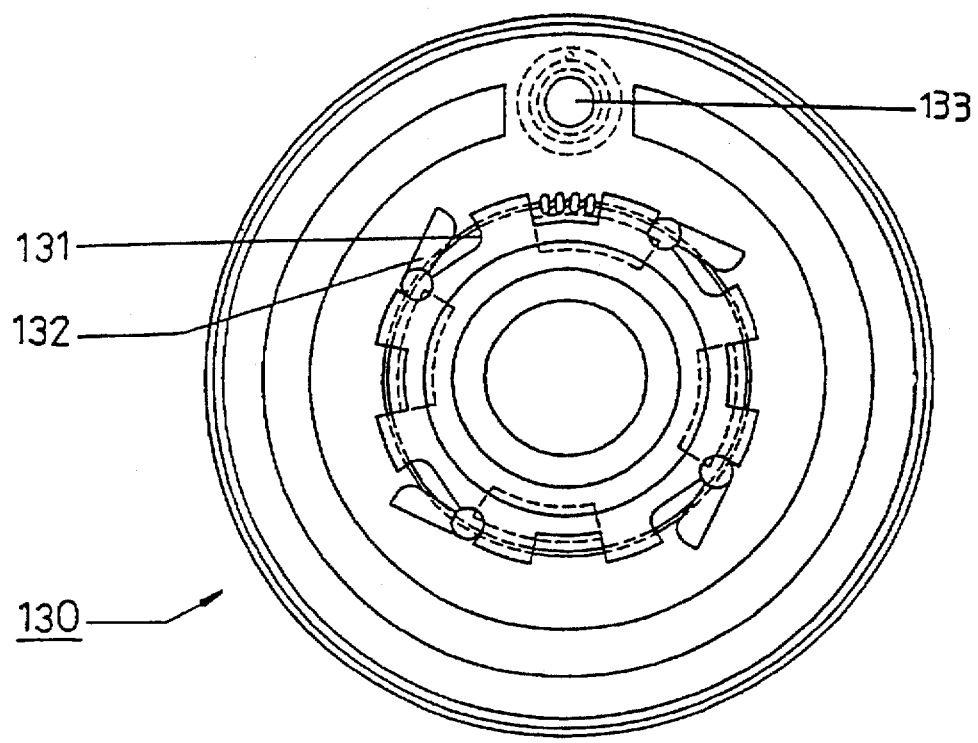
FIG. 7 is a right side view of a shaft housing adopted in the apparatus for changing power direction shown in FIG. 6.

As shown in FIGS. 6 and 7, a shaft housing 130 has a hollow cylindrical protrusion at the right thereof and a plurality of openings 131 at the outside thereof, into which a plurality of third pawls 132 are inserted. The shaft housing 130 has a circular plate type sidewall and a hole 133 for receiving the first gear 81 of the above present invention at a position which is near the pedal shaft 120 compared with the hole 33 of the above present invention since the shaft housing 130 is obtained by removing the rim of the shaft housing 30.

A change ring 140 of this embodiment is different from the change ring 40 of the above present invention in the aspect in that a fifth gear 141 is formed at one side thereof toward the outside of the pedal shaft 120. The change ring 140 locates between the third pawls 132 and the third ratchet 151 of the carrier 150.

Figure 8:
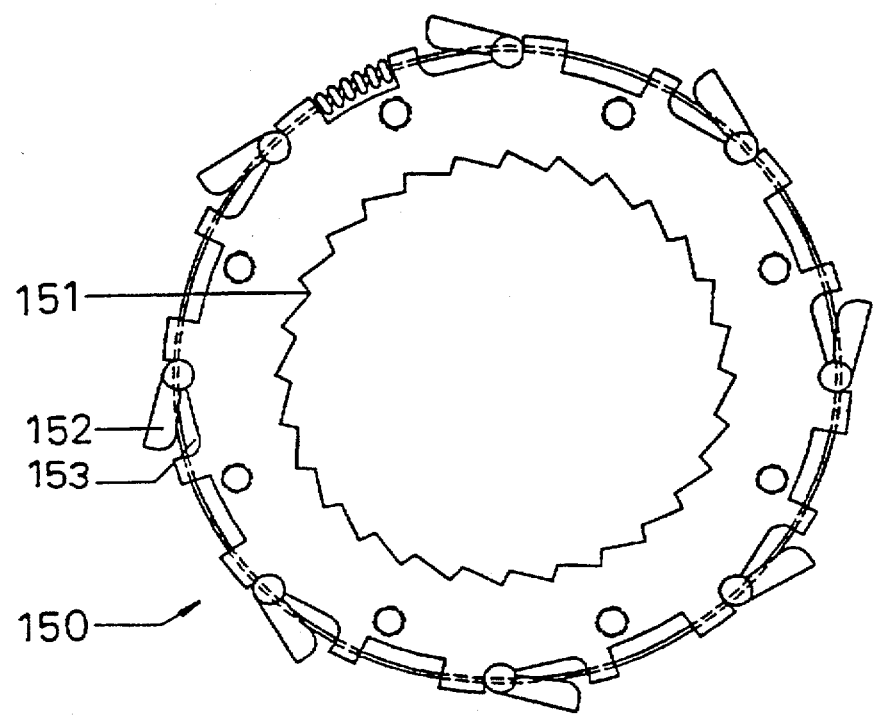
FIG. 8 is a left side view of a carrier adopted in the apparatus for changing power direction shown in FIG. 6.

As shown in FIGS. 6 and 8, a carrier 150 of this embodiment has a plurality of opening 153 into which a plurality of fourth pawls 152 are inserted at the outside of a left portion of the carrier 150 and a third ratchet 151 at the inside of the left portion. Also, a right portion of the carrier 150 is the same as that of the carrier 50 of the above present invention. In the carrier 150 having the above structure, the fourth pawls 152 are engaged with a fourth latch 172 of a sprocket cap 170 and the third ratchet 151 is engaged with the third pawls 132 of the shaft housing 130.

A sun gear 160 of this embodiment has an inside fixed to the pedal shaft 160 and an outside having a sixth gear 161 which is engaged only with a plurality of planetary gears 154.

Figure 9:
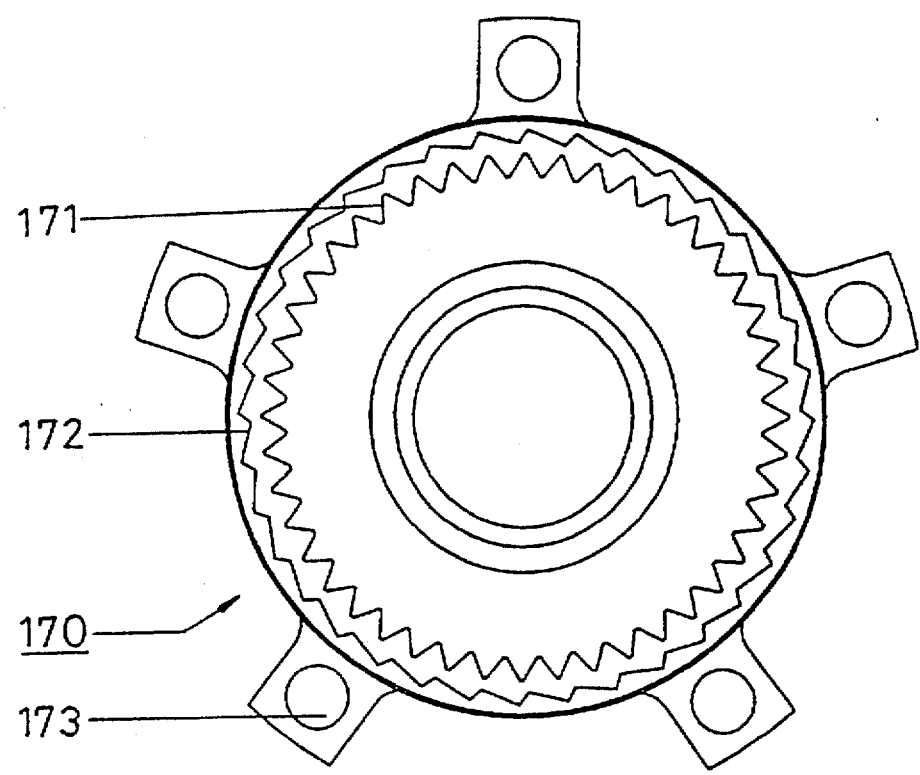
FIG. 9 is a left side view of a sprocket cap adopted in the apparatus for changing power direction shown in FIG. 6.

Also, as shown in FIGS. 6 and 9, the sprocket cap 170 has a seventh gear 171 at the right FIG. 6 of the inside of the rim and a fourth ratchet 172 at the left thereof. Thus, the seventh gear 171 is engaged with the planetary gears 154 of the carrier 150 and the fourth ratchet 172 is engaged with the fourth pawls 152 of the carrier 150.

The other parts are the same as those of the above present invention. Also, in FIGS. 6 to 9, reference numeral 110 represents a bicycle frame, reference numeral 111 represents a pedal shaft hub, reference numeral 153 represents a carrier ring, reference numeral 155 represents a shaft of the planetary gears, and reference numeral 173 represents a sprocket bracket.

The operation and effect of this embodiment having the above structure will be described below.

First, the "forward traveling by forward pedaling" is performed by the following mechanism. When the pedal shaft 120 rotates clockwise, the sun gear 160 rotates in the same direction as the pedal shaft 120 and the planetary gears 154 rotates counterclockwise. However, the carrier 150 itself rotates clockwise in a different rotating rate from that of the pedal shaft 120 and the fourth pawls 152 of the carrier 150 is engaged with the fourth ratchet 172 of the sprocket cap 170, thereby rotating the sprocket cap 170 clockwise.

Next, the "forward traveling by rearward pedaling" is performed when the third pawls 132 of the shaft housing 130 are engaged with the third ratchet 151 of the carrier 150 after the change ring 140 allows the release of the third pawls 132 from the holes of the change ring 140. That is, the forward traveling by rearward pedaling is performed while the carrier 150 is fixed. Thus, the planetary gears 154 change the direction of power from the sun gear 160 while rotating around their own shafts, thereby providing the power to the sprocket cap 170 clockwise.

Finally, the "idling by rearward pedaling" is performed by the following mechanism. The change ring 140 blocks the release of the third pawls 132 from the openings of the shaft housing, so that the carrier 150 rotates in the same direction as the pedal shaft 120. As a result, the power from the sun gear 160 cannot be transmitted to the sprocket cap 170.

EMBODIMENT 2

The second embodiment of the present invention relates to the controlling of the change ring 40.

The change ring 40 of the above present invention releases and blocks the first pawls 32 by using the first gear 81 (see FIGS. 1 and 2) formed at the sidewall of the shaft housing 30. In order to control the first gear 81 formed in the shaft housing 30, the shaft housing 30 should be drilled to form a hole 33 through which the changing lever 80 is installed from the outside. When rotating the changing lever 80 in the front and back, the first gear 81 rotates in cooperation with the changing lever 80 and the change ring 40 engaged with the first gear 81 rotates in the same direction as the changing lever 80, thereby releasing and blocking the first pawls 32.

The above changing lever 80 is protruded to the outside of the shaft housing 30, so that the protruded changing lever 80 prevents the successful coupling of the apparatus for changing power direction to the conventional bicycle.

Thus, the second embodiment is to improve the above defect. Here, a steel wire is adopted instead of the changing lever to easily connect the apparatus for changing power direction to the conventional bicycle, thereby controlling the change ring.

Figure 10:
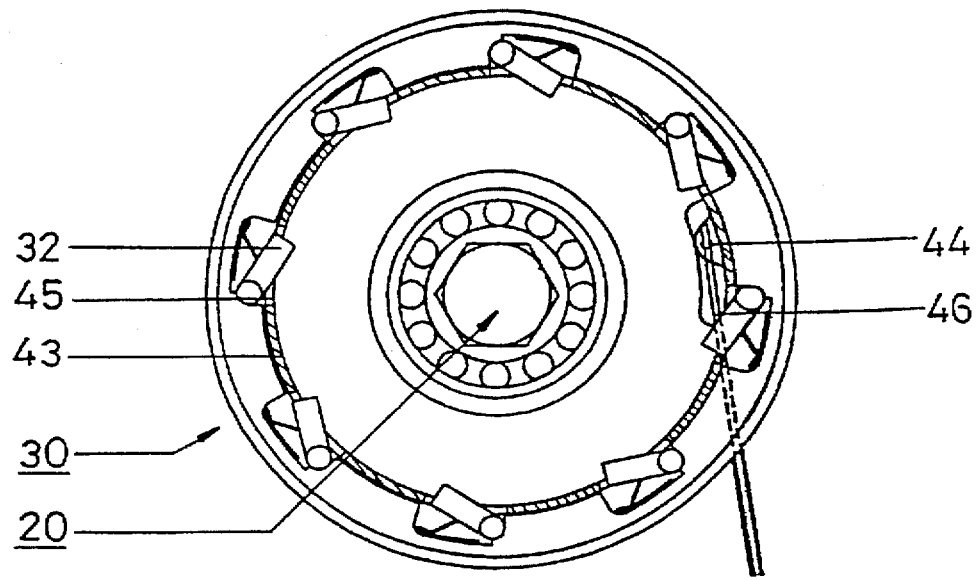
FIG. 10 is a right side view of a means for controlling a change ring according to another embodiment of the present invention.

As shown in FIG. 10, a means for controlling a change ring 43 of the second embodiment has a loop 44 at one end of the change ring 43 having a plurality of holes 45. Here, the loop 44 is for connecting a steel wire 46 from the outside of the shaft housing 30 via a hole 33, thereby controlling the change ring 43. That is, the change ring 43 blocks the first pawls 32 when the steel wire is pulled, and the change ring 43 releases the first pawls 32 when the steel wire 46 is pushed.

EMBODIMENT 3

The third embodiment relates to the shaft housing 30, wherein the shape of the shaft housing 30 is modified to a shaped which is suitable for directly attaching the apparatus for changing power direction of the present invention to the conventional bicycle without the modification of the conventional bicycle.

Figures 11, 11A:
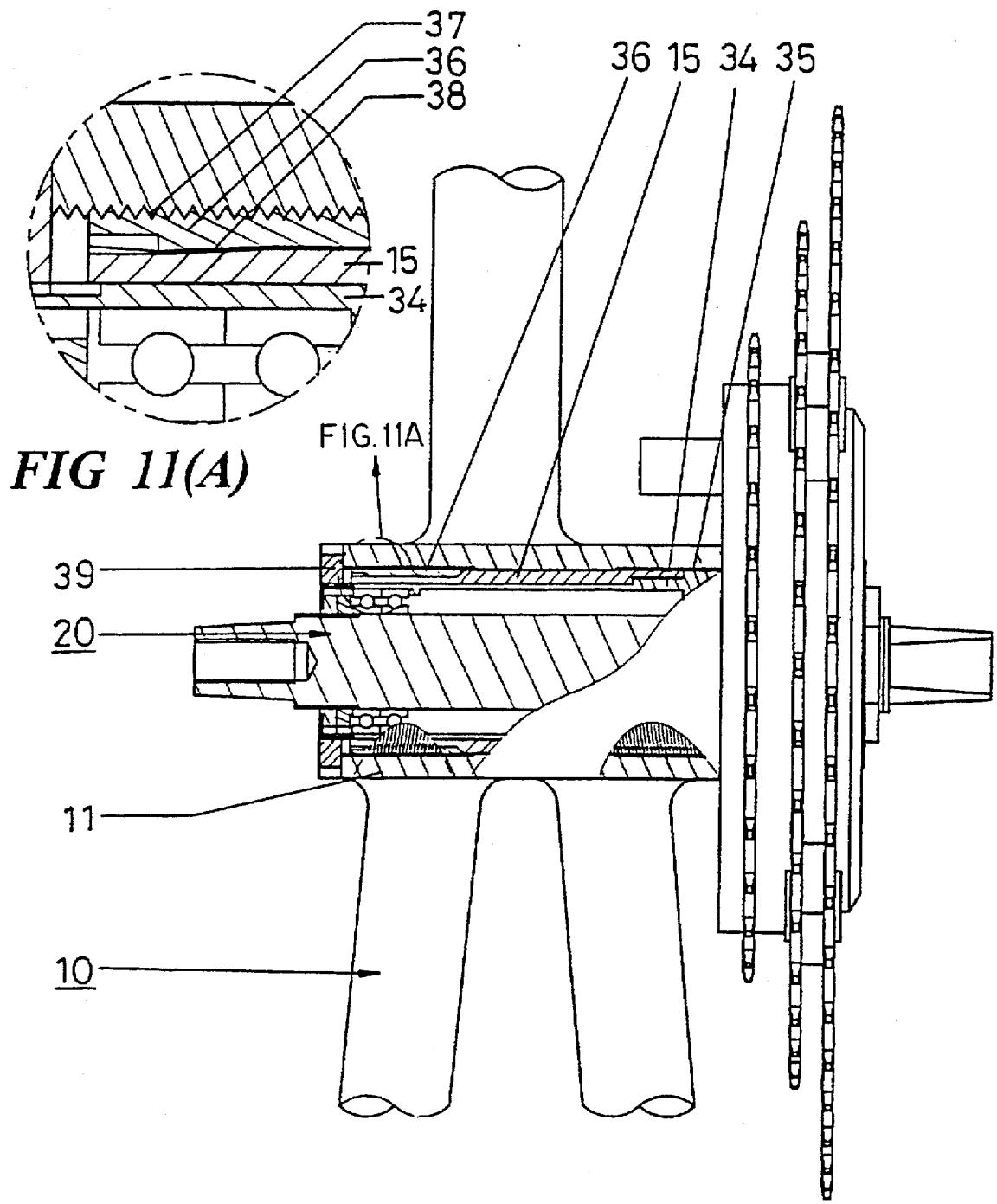
FIGS. 11 and 11A are a cross-sectional view when the apparatus for changing power direction is installed to a conventional bicycle according to still another embodiment of the present invention.

FIG. 11 shows the state where the apparatus for changing power direction of the present invention is installed to the conventional bicycle. In the third embodiment, appearance of the shaft housing 30 having a hollow cylindrical shape is improved.

A shaft housing 34 of this embodiment has a multiple-stepped appearance. That is, the cylindrical shaft housing 34 is multiple-stepped to the left in sequence, wherein the diameter of the left side is smaller than that of the right side of the shaft housing 34. Also, a connection tube 15 is adopted to provide compatibility when connecting the apparatus for changing power direction to the pedal hub 11 of the conventional bicycle. A right-handed screw 35 is formed at the outside of the connection tube 15. Also, the outer diameter of the connection tube 35 is the same as that of the pedal hub 11 and the inner diameter thereof is the same as the outer diameter of the shaft housing 34. On the other hand, an additional nut 36 is manufactured as follows. A left-handed screw 37 is formed at the outside of the nut 36 and a left inside of the nut 36 is processed to have a taper 38.

Accordingly, the shaft housing 34 is installed to the conventional bicycle by the following procedures. First, the connection tube is coupled with the pedal hub 11 using the right-handed screw 35 and the connection tube 15 is coupled with the shaft housing 34 through a spline coupling. Then, the nut 36 is screwed at the opposite side through left-handed screw coupling by the left-handed screw 37 and then the assembling is completed using a washer 39.

When connecting the apparatus for changing power direction of this embodiment to the conventional bicycle, the shaft housing 34 is much tightly connected to the pedal hub 11 even though a reverse load caused by the pulling back of the bicycle is applied to the apparatus for changing power direction of the present invention via the driving sprocket. That is, as the reverse load applied to the apparatus for changing power direction increases, the shaft housing 34 is much tightly connected to the pedal hub 11 by the taper 38 formed at the inside of the nut 36 since the right-handed screw 35 of the connection tube 15 and the left-handed screw 37 of the nut 36 are coupled in the opposite direction each other.

Also, the shaft housing 30 and the pedal hub 11 may be tightly coupled each other by processing a contact portion between the sides of the shaft housing 30 and the pedal hub 11 to have a ridge and valley-type.

Industrial Applicability

Therefore, the bicycle travels forward when pedaling forward and rearward in the state where the apparatus for changing power direction is installed to the bicycle. Also, an idling may occur if required when pedaling rearward in the state where the apparatus for changing power direction is installed to the bicycle. The apparatus for changing power direction of the present invention as one of "bi-directional pedaling apparatus" is different from the conventional bi-directional pedaling apparatus in the constituent parts and operating mechanism. In addition, according to the apparatus for changing power direction of the present invention, the shapes of each constituent elements are optimized, thereby preventing the concentration of load on a specific portion. Also, all constituent parts are integrally formed, thereby simplifying the assembling process thereof. The apparatus for changing power direction adopts a changing lever so as to easily operate the same, and an auxiliary ring which is for installing the apparatus for changing power direction to the conventional bicycle without the modification of the conventional bicycle.

What is claimed is:

1. An apparatus for changing power direction for a bicycle as a bi-directional pedaling apparatus including a sun gear coupled with a pedal shaft, a carrier to which a plurality of planetary gears are rotatably fixed, and a driving sprocket with an internal gear, said apparatus for changing power direction comprising:

a shaft housing for supporting a rotating pedal shaft, having at least one or more openings at the inside of a rim of a right cap of said shaft housing and a hole at the sidewall thereof, wherein a plurality of first pawls are inserted into said openings and a means for controlling a change ring is inserted into said hole, and said first pawls are engaged with a first ratchet of a carrier;

a change ring positioned between said shaft housing and a first ratchet of a carrier, having a second gear at one side thereof toward said pedal shaft with being coupled with said means for controlling said change ring and at least one or more holes at the surface portion thereof for permitting projection or shrink of said first pawls;

a carrier with a hollow cylindrical shape, having a first ratchet and a second ratchet at the outside and inside of a left portion thereof, respectively, and a ring having at least one or more holes at a right portion thereof, wherein the right portion is integrally coupled with the left portion such that at least one or more planetary gears are rotatably set by a planetary gear shaft, and said second ratchet is engaged with second pawls of a sun gear, and an inner portion of said planetary gears is engaged with a third gear of a sun gear and an outer portion thereof is engaged with a fourth gear formed at the inside of a sprocket cap;

a sun gear with a hollow cylindrical shape with steps, having at least one or more openings at the outside of a left portion thereof with smaller diameter, wherein said second pawls are connect into said openings, and a center opening to be coupled with said pedal shaft at the inside of the left portion, and a third gear at the outside of a right portion with larger diameter; and a sprocket cap, having a fourth gear at the right of the inside of the rim thereof, wherein said sprocket cap freely rotates independent on said pedal shaft and is fixed to said pedal shaft by a fixing nut.

2. An apparatus for changing power direction for a bicycle as claimed in claim 1, wherein eight first pawls are located on said openings of said shaft housing.

3. An apparatus for changing power direction for a bicycle as claimed in claim 1, wherein said means for controlling said change ring is a first gear.

4. An apparatus for changing power direction for a bicycle as claimed in claim 3, wherein said first gear is controlled by installing a changing lever at the outside of said shaft housing.

5. An apparatus for changing power direction for a bicycle as claimed in claim 3, wherein said means for controlling said change ring of said shaft housing controls a change ring using a steel wire, wherein a loop is formed at one end of said change ring and said steel wire is inserted from the outside to said loop via a hole of said shaft housing.

6. An apparatus for chancing power direction for a bicycle as claimed in claim 1, wherein the number of said holes of said change ring is eight.

7. An apparatus for changing power direction for a bicycle as claimed in claim 1, wherein the number of said planetary gears of said carrier is eight.

8. An apparatus for changing power direction for a bicycle as claimed in claim 1, wherein four second pawls are inserted into said openings of said sun gear.

9. An apparatus for changing power direction for a bicycle as claimed in claim 2, wherein a spring device is inserted between said openings and said pawls.

10. An apparatus for changing power direction for a bicycle as claimed in claim 9, wherein said spring device is one circular spring for connecting flutes of pawls.

11. An apparatus for changing power direction for a bicycle as claimed in claim 1, wherein said sun gear has a center opening with a hexagonal shape.

12. An apparatus for changing power direction for a bicycle as claimed in claim 1, wherein said sun ear has a center opening with a spline-like shape.

13. An apparatus for changing power direction for a bicycle as claimed in claim 1, wherein said sprocket cap has a screw at the outside of a left portion of the rim thereof and at least one or more brackets at the outside of a right portion thereof such that one or more driving sprockets with multiple steps are coupled to said sprocket cap.

14. An apparatus for changing power direction for a bicycle as claimed in claim 13, wherein a bearing is fixed to the center of said sprocket cap.

15. An apparatus for changing power direction for a bicycle as a bi-directional pedaling apparatus including a sun gear coupled with a pedal shaft, a carrier to which a plurality of planetary gears are rotatably fixed, and a driving sprocket with an internal gear, said apparatus for changing power direction comprising:

a shaft housing with a circular plate-type sidewall, for supporting a rotating pedal shaft, having a hollow cylindrical protrusion at the right thereof, at least one or more third pawls at the outside thereof, and a hole for receiving a means for controlling a change ring;

a change ring positioned between said third pawls and a third ratchet of a carrier, having a fifth gear at one side thereof toward the outside of said pedal shaft with being coupled with said means for controlling said change ring and at least one or more holes at the surface portion thereof, wherein said third pawls are controlled;

a carrier, having at least one or more fourth pawls and said third ratchet at the outside and inside of a left portion thereof, respectively, and a ring with at least one or more holes at a right portion thereof, wherein the right portion is integrally coupled with the left portion such that at least one or more planetary gears are rotatably set by a planetary gear shaft in said ring, and said fourth pawls is engaged with a fourth ratchet of a sprocket cap, and said third ratchet is engaged with said third pawls of said shaft housing, and an inner portion of said planetary gears is engaged with a sixth gear of a sun gear, and an outer portion thereof is engaged with a seventh gear formed at the inside of a sprocket cap;

a sun gear having an inside fixed to said pedal shaft and an outside with a sixth gear; and a sprocket cap, having a seventh gear at the inside of the rim thereof and a fourth ratchet at the outside thereof, wherein said sprocket cap freely rotates independent on said pedal shaft and is fixed to said pedal shaft by a fixing nut.

16. An apparatus for changing power direction for a bicycle as claimed in claim 1, wherein said shaft housing is compatibly installed at the pedal hub of the bicycle by forming the outside of said shaft housing with multiple steps in the left in sequence and by using a connection tube with a right-handed screwed outside, having an outer diameter which is the same as the diameter of said pedal hub and an inner diameter which is the same as that of said shaft housing, and a nut having a left-handed screwed outside and a taper-processed left inside.

* * * * *